Figure 1:
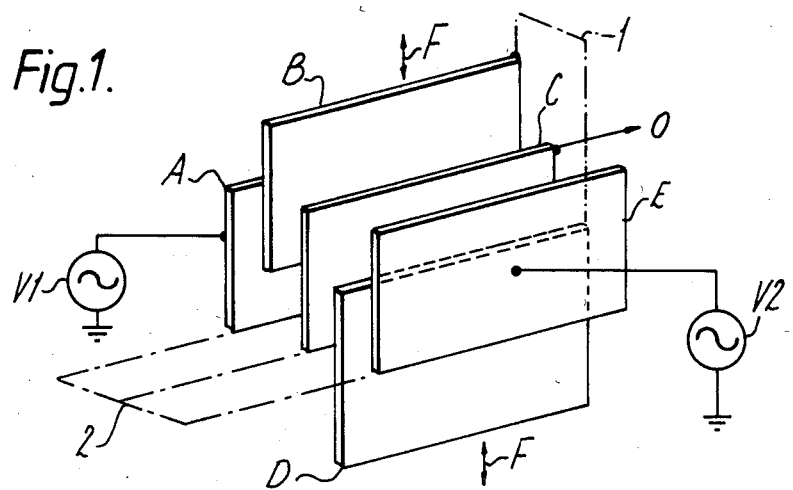

United States Patent [19]
Hatton et al.

[11] Patent Number: 4,561,038
[45] Date of Patent: Dec. 24, 1985

[54] TRANSDUCERS

[75] Inventors: John S. Hatton; Roland N. Clarke; Raj K. Saini, all of West Midlands, England

[73] Assignee: W & T Avery Limited, England

[21] Appl. No.: 596,558

[22] Filed: Apr. 4, 1984

[51] Int. Cl.[4] .............................................. H01G 7/00
[52] U.S. Cl. ................................................... 361/280
[58] Field of Search ...................... 361/277, 280; 332/2

[56] References Cited
U.S. PATENT DOCUMENTS
3,702,957 11/1972 Wolfendale .......................... 361/280

Primary Examiner—L. T. Hix
Assistant Examiner—Douglas S. Lee
Attorney, Agent, or Firm—Kirschstein, Kirschstein, Ottinger & Israel

[57] ABSTRACT

A transducer designed to give an output which is dependent upon the relative displacement of two bodies comprises two sets of spaced plates interleaved one with the other to form a capacitor, the two sets of plates being movable relative to each other in a direction which maintains the spacing between them, the shape and or disposition of the plates being such that when an oscillating voltage is applied across the capacitor an output signal derived from an intermediate plate varies with changes in the position of the two sets of plates.

Such an arrangement gives an output which is substantially linearly dependent on displacement, and by attaching one set of plates to some form of spring the device can be used as a force transducer.

8 Claims, 5 Drawing Figures

TRANSDUCERS

This invention relates to transducers of the kind arranged to give an output which is dependent upon the relative displacement of two bodies.

According to the invention such a transducer comprises a capacitor incorporating two sets of rigid, electrically conductive plates interleaved one with the other, with spacing between them, the two sets of plates being movable relative to each other in a direction which maintains the spacing substantially constant, and the shape and/or disposition of the plates being such that when an oscillating voltage is applied across the capacitor an output signal derived from an intermediate plate varies with changes in the relative positions of the two sets of plates.

In use, the two sets of plates are arranged to be mounted on, or otherwise coupled to, two relatively movable bodies in order to measure or monitor their relative displacement, the mounting or coupling being such that the sets of plates are constrained for relative movement in a manner which maintains the substantially constant spacing between them.

It has been found that such an arrangement can be designed to give an output which is substantially linearly dependent on displacement, unlike capacitor type displacement transducers of known kind in which the separation of the plates is varied.

By attaching one set of plates to some form of spring a transducer in accordance with the invention can be used as a force transducer.

The plates are preferably planar with relative movement being arranged to take place in the planes of the plates. This can be a linear movement or a rotational movement about an axis perpendicular to the planes of the plates.

However in some cases the two sets of plates may be of arcuate shape disposed coaxially with respect to each other, with one set of plates rotatable relative to the other about a common axis.

Figure 2:
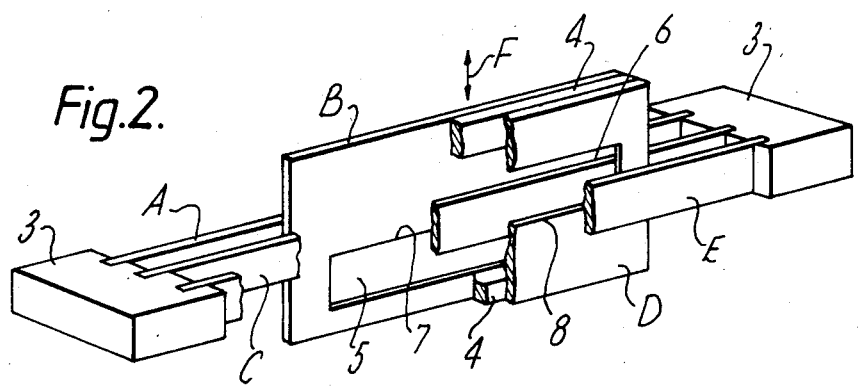
Figure 3:
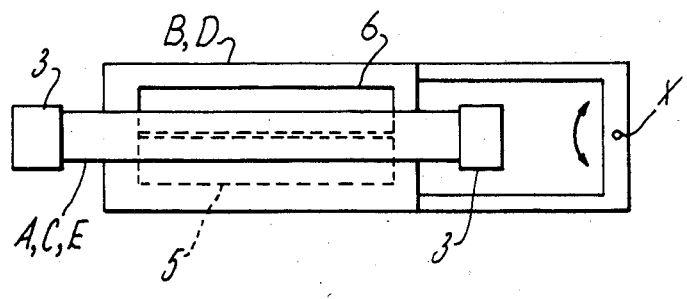
Figure 4:
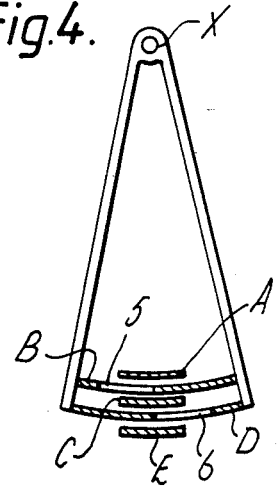
Figure 5:
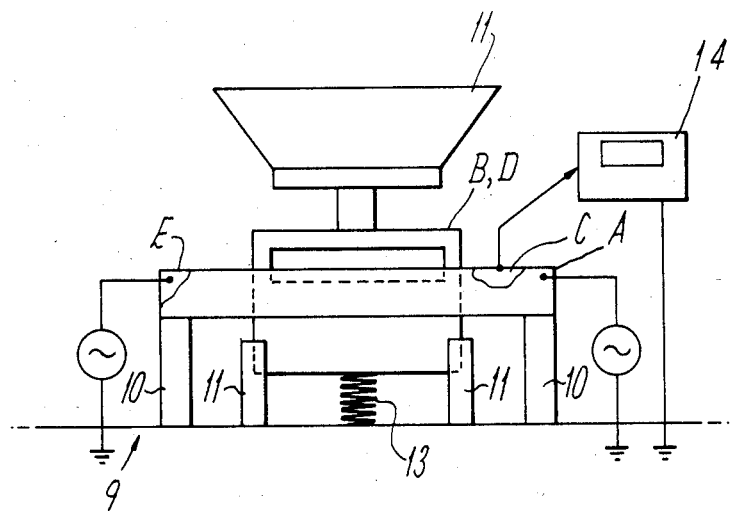

The invention will be further described, by way of example, with reference to FIGS. 1 to 5 of the accompanying schematic drawings, in which FIG. 1 illustrates the principle of the invention, FIGS. 2 to 4 illustrate different embodiments utilising the principle, and FIG. 5 represents in diagrammatic form weighing equipment utilising the invention.

Thus referring first to FIG. 1, this shows in diagrammatic form a transducer comprising five electrically conductive plates A, B, C, D and E spaced from each other. The second and fourth plates B, D, are connected to each other electrically, and in use are either both earthed or maintained at the same potential by connection, for example, to the centre tap of a transformer or a reactor which is connected to an alternating current supply. These plates B, D are mounted on a first structure, represented diagrammatically by the chain line 1, which is movable relative to a second structure, represented by the chain line 2, carrying the plates A, C, E, the movement being in a direction parallel to the planes of the plates as indicated by the arrows F so that the spacing between them is maintained substantially constant.

The movable plates B, D are offset relative to each other in the direction of movement, in a manner such that as the region of the plate B lying between the plates A and C increases, the region of the plate D lying between the plates C and E decreases, and vice versa.

The three plates A, C, E are electrically insulated from each other and from the supporting structure 2 and, in use, oscillating electrical signals $V_1$ and $V_2$ are supplied to the two outer plates A and E respectively, these signals having the same frequency but being in antiphase to each other. An output signal is taken from the centre plate C, as at 0, and, as the plates B and D move relative to the plates A, C and E, they produce a change in the capacitive coupling between plates A and C and between plates E and C, and as a result the output signal changes by an amount dependent upon the degree of movement of the plates B, D. The signal may be fed into some form of measuring or monitoring device, either to give an indication of the extent of movement of the body on which the plates B, D are mounted and/or to operate a warning signal should this exceed a predetermined value.

In use, the first support structure may be coupled to some form of spring, the device then acting as a force transducer which may be applied, for example, to weighing equipment, the signal being a function of the force acting on the plates B, D against the spring pressure, and the equipment incorporating means for converting the electrical signal which is produced into some form of visible indication.

The arrangement has a number of advantages when compared with other designs of capacitive transducer. Thus the capacitive plate arrangement has a fairly simple construction, and its performance is not significantly affected by errors in manufacture. The electrical connections to the plates are not moved by the displacement that occurs in operation, and the output is linearly dependent on the displacement, unlike parallel plate capacitive transducers of the kind in which the separation of the plates is changed, as the capacitance is inversely proportional to separation. Furthermore transverse motion of the plates B, D in a direction perpendicular to the planes of the plates has little effect on the output signal, providing contact with the other plates is avoided, and the non-linear electric field component near the interleaving plate edges is largely undisturbed. It has further been found that temperature effects are only second order.

There are a number of ways that a transducer in accordance with the invention may be constructed for practical operation. One such arrangement is illustrated in FIG. 2.

In this arrangement the plates A, C, E are in the form of rigid metal strips fixed into insulating support blocks 3 at their ends. The plates B, D are rectangular in shape, of greater width than the strips A, C, E, and extend between the strips A, C and strips C, E respectively, as shown, being connected together along their longer edges by conducting spacers 4.

In each of the two plates B, D there is formed a rectangular slot 5, 6 respectively, the slots extending parallel to the strips A, C, E, but being offset relative to each other such that their opposite longer edges 7, 8 are in alignment. The structure formed by the plates B, D is again movable relative to the strips A, C, E in the direction indicated by the arrows F, and when oscillating electrical signals of the same frequency but of opposite phase are applied to the two outer strips A, E an output signal taken from the centre strip C will vary with the degree of displacement of the plates B, D relative to the strips A, C, E, as in the case of arrangement illustrated in FIG. 1.

However the plates B, D, need not necessarily move linearly, but could in some cases rotate about a suitably positioned axis X lying perpendicularly to the plates as indicated diagrammatically in FIG. 3.

Another arrangement in which the plates B, D are supported for rotational movement is illustrated in FIG. 4. The plates in this case are of arcuate shape and are disposed coaxially with the two outer plates A, E and the middle plate C supported by insulating mountings, and the plates B, D, linked electrically and mounted for rotation about the common axis X, the plates B, D again being provided with offset slots 5, 6 such that an output signal, taken from plate C, when oscillating signals of the same frequency but opposite phase are applied to the two outer plates A, E, depends upon the angular position of the plates B, D.

Other configurations are clearly possible.

FIG. 5 illustrates in diagrammatic form the application of the invention to a weighing device. The transducer is as shown in FIG. 2 the plates A, C, E being fixed relative to a base 9 by supports 10. The assembly of plates B, D which supports a scale pan 11 is slidable in guides 12 relative to the base and is biased upwards by a compression spring 13, the guides ensuring that the spacing between the two sets of plates is maintained substantially constant.

Alternating current signals are arranged to be supplied to the outer plates A, E as previously described, and an output signal is fed from the plate C to a display unit 14 where it is converted by an suitable means into a visual signal representative of the movement of the plates B, D and calibrated to indicate the weight placed on the scale pan 11.

We claim:

1. A transducer comprising a capacitor including:
   (a) a first set of at least threee, mutally spaced, rigid, electrically conductive plates,
   (b) a second set of at least two, mutually spaced, rigid, electrically conductive plates,
   (c) means mounting the two sets of plates with the plates of the second set interleaved with the plates of the first set, with spacing between the plates of the first set and the plates of the second set and with the plates of the two sets being movable relative to each other in a direction which maintains the spacing between the plates of the two sets substantially constant.
   (d) means to permit an oscillating voltage to be applied across the outer plates of the first set, and
   (e) means enabling an output voltage signal to be taken from an intermediate plate of the first set, the second set of plates having a shape and disposition such that a change in the relative positions of the two sets of plates produces a change in said output voltage signal, and such that as the interleaved region of one plate of the second set of plates increases, the interleaved region of another plate of the second set of plates decreases.

2. A transducer according to claim 1 in which the plates are mounted on or coupled to two relatively movable bodies, the mounting or coupling being such that the sets of plates are constrained to move in a manner which maintains the substantially constant spacing between them, and incorporating means responsive to said output signals for giving an indication of the relative displacement of the bodies.

3. A transducer according to claim 2 in which relative movement of the two sets of plates is opposed by spring means.

4. A transducer according to claim 1 wherein the plates are planar and relative movement is arranged to take place in the planes of the plates.

5. A transducer according to claim 1 wherein the two sets of plates are of arcuate shape disposed coaxially with respect to each other, with one set of plates rotatable with respect to the other about their common axis.

6. A transducer according to claim 1 wherein the plates are spaced uniformly from each other.

7. A transducer according to claim 1 comprising five electrically conductive plates in which the first, third and fifth plates form the first set, and the second and fourth plates form a second set, the two plates of said second set being connected to each other mechanically and electrically and being movable relative to the first set, but being offset with respect to each other in the direction of movement, the three plates of the first set being electrically insulated from each other, and the arrangement including means for applying oscillating electrical signals of the same frequency but of opposite phase to the first and fifth plates, and indicating means responsive to an output signal taken from the third plate for producing an visual signal which is dependent upon the degree of movement of the said other set of plates.

8. Weighing equipment incorporating a transducer according to claim 7.

* * * * *